(12) United States Patent
Bandl-Konrad et al.

(10) Patent No.: US 7,210,288 B2
(45) Date of Patent: May 1, 2007

(54) EXHAUST GAS AFTERTREATMENT INSTALLATION AND METHOD

(75) Inventors: Brigitte Bandl-Konrad, Goeppingen (DE); Andreas Hertzberg, Markgroeningen (DE); Bernd Krutzsch, Denkendorf (DE); Arno Nolte, Stuttgart (DE); Markus Paule, Korb (DE); Stefan Renfftlen, Eislingen (DE); Norbert Waldbuesser, Stuttgart (DE); Michel Weibel, Stuttgart (DE); Guenter Wenninger, Stuttgart (DE); Rolf Wunsch, Malsch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/541,311

(22) PCT Filed: Dec. 16, 2003

(86) PCT No.: PCT/EP03/14313

§ 371 (c)(1),
(2), (4) Date: Jan. 24, 2006

(87) PCT Pub. No.: WO2004/061278

PCT Pub. Date: Jul. 22, 2004

(65) Prior Publication Data
US 2006/0153761 A1 Jul. 13, 2006

(30) Foreign Application Priority Data
Jan. 2, 2003 (DE) ................. 103 00 298

(51) Int. Cl.
*F01N 3/00* (2006.01)
(52) U.S. Cl. ............... 60/297; 60/274; 60/286; 60/301; 60/303; 422/171; 422/172; 422/178; 423/212; 423/213.2; 423/213.5; 423/213.7; 423/239.1

(58) Field of Classification Search ............ 60/274, 60/285, 286, 295, 297, 299, 301, 303, 311; 422/168, 171, 172, 178, 180; 423/212, 210, 423/213.2, 213.5, 213.7, 239.1, 245.1, 247
See application file for complete search history.

(56) References Cited

U.S. PATENT DOCUMENTS 6,732,507 B1 * 5/2004 Stanglmaier et al. ......... 60/285

(Continued)

FOREIGN PATENT DOCUMENTS

DE 19626835 1/1997

(Continued)

OTHER PUBLICATIONS

A. Bunting, "Springing the Trap", Automotive Engineer, May 2000, pp. 73-74, vol. 25, No. 5, Mechanical Engineering Publ. Ltd., Great Britain, XP000936087, ISSN: 0307-6490.

(Continued)

*Primary Examiner*—Binh Q. Tran
(74) *Attorney, Agent, or Firm*—Crowell & Moring LLP

(57) ABSTRACT

An exhaust gas aftertreatment installment and associated exhaust gas aftertreatment method utilizes a nitrogen oxide storage catalytic converter and an SCR catalytic converter. A particulate filter is provided upstream of the nitrogen oxide storage catalytic converter or between the latter and the SCR catalytic converter or downstream of the SCR catalytic converter. The time of regeneration operating phases of the nitrogen oxide storage catalytic converter can be determined as a function of the nitrogen oxide content of the exhaust gas downstream of the nitrogen oxide storage catalytic converter or of the SCR catalytic converter and/or as a function of the ammonia loading of the latter. Moreover, a desired ammonia generation quantity can be determined for a respective regeneration operating phase. The installation and method are adopted for use for motor vehicle internal combustion engines and other engines which are operated predominantly in lean-burn mode.

17 Claims, 3 Drawing Sheets

U.S. PATENT DOCUMENTS

| | | | |
|---|---|---|---|
| 6,832,473 B2* | 12/2004 | Kupe et al. | 60/286 |
| 6,857,265 B2* | 2/2005 | Twigg et al. | 60/295 |
| 6,863,874 B1* | 3/2005 | Twigg | 423/210 |
| 6,865,882 B2* | 3/2005 | Minami | 60/295 |
| 6,912,847 B2* | 7/2005 | Deeba | 60/297 |
| 7,062,904 B1* | 6/2006 | Hu et al. | 60/286 |
| 7,063,642 B1* | 6/2006 | Hu et al. | 477/100 |

FOREIGN PATENT DOCUMENTS

| | | |
|---|---|---|
| DE | 19827195 | 12/1999 |
| DE | 19921974 | 11/2000 |
| DE | 19955324 | 5/2001 |
| DE | 10020100 | 10/2001 |
| DE | 10025044 | 11/2001 |
| EP | 0540280 | 5/1993 |
| EP | 0560991 | 9/1993 |
| EP | 0573672 | 12/1993 |
| EP | 0758713 | 2/1997 |
| EP | 0878609 | 11/1998 |
| EP | 1203611 | 5/2002 |
| WO | WO 97/17532 | 5/1997 |
| WO | WO 99 39809 | 8/1999 |
| WO | WO 0021647 | 4/2000 |

OTHER PUBLICATIONS

International Search Report dated Apr. 1, 2004.

\* cited by examiner

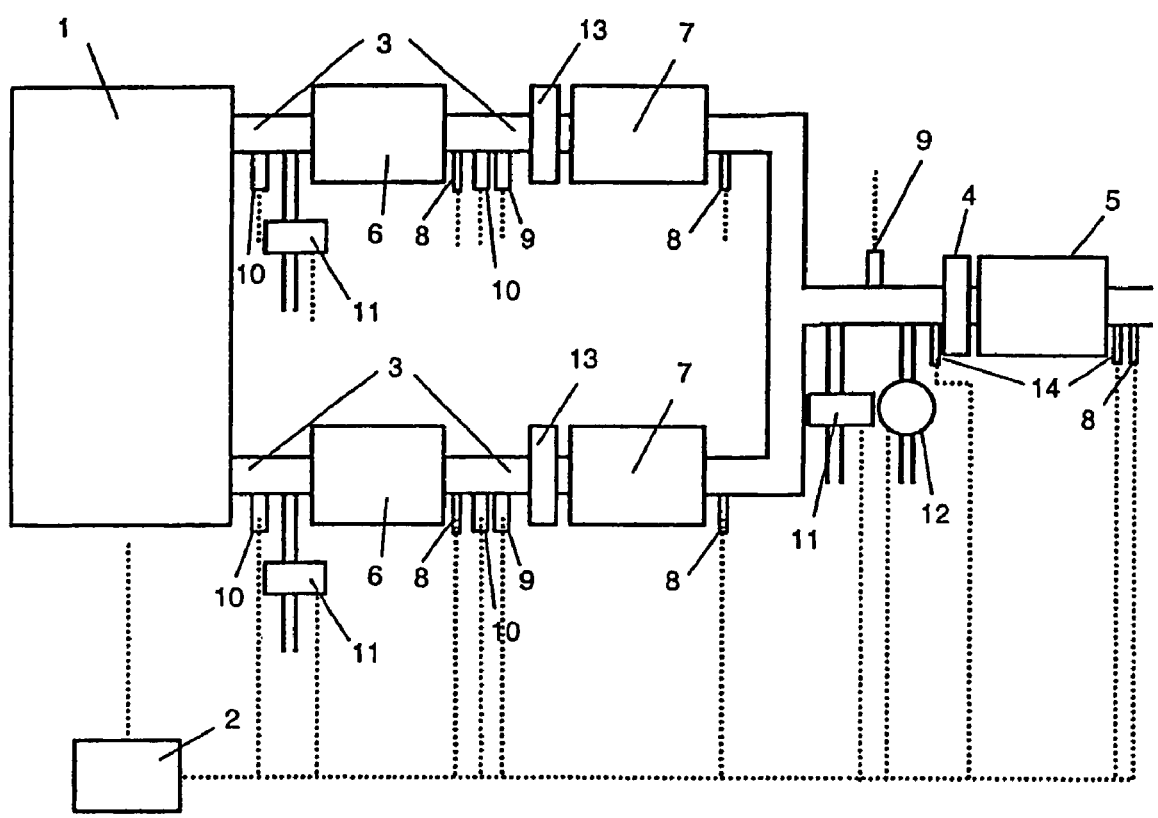

EXHAUST GAS AFTERTREATMENT INSTALLATION AND METHOD

BACKGROUND AND SUMMARY OF THE INVENTION

The invention relates to an exhaust gas aftertreatment installation for the aftertreatment of an exhaust gas generated by a combustion device, in particular a motor vehicle internal combustion engine, having a nitrogen oxide storage catalytic converter and an SCR catalytic converter with the ability to store ammonia, which is arranged downstream of the nitrogen oxide storage catalytic converter or integrated with the latter in a common catalytic converter unit. The invention also relates to an exhaust gas aftertreatment method which can be carried out using an installation of this type. Installations and methods of this type are used in particular for the aftertreatment or purification of exhaust gases from internal combustion engines operated predominantly in lean-burn mode in motor vehicles.

The use of nitrogen oxide storage catalytic converters, also known as $NO_x$ storage catalytic converters or $NO_x$ adsorber catalytic converters, or NSC for short, is generally known for lowering the levels of nitrogen oxides downstream of internal combustion engines operated in lean-burn mode. Lean operating phases of the internal combustion engine correspond to adsorption phases of the nitrogen oxide storage catalytic converter, in which the nitrogen oxide storage catalytic converter oxidizes nitrogen monoxide (NO) to form nitrogen dioxide ($NO_2$), which it temporarily stores in the form of nitrates. During brief, periodic regeneration or desorption phases, the stored nitrates are removed from the nitrogen oxide storage catalytic converter by the nitrates being converted into nitrogen dioxide and then nitrogen monoxide. The latter is then reduced to form nitrogen by suitable reducing agents.

One known technique used to provide the required reducing agents consists in switching the combustion device, which is operated predominantly in lean-burn mode and the exhaust-gas from which is being aftertreated, to rich-burn mode for a brief period of time, with the result that hydrogen ($H_2$), carbon monoxide (CO) and unburnt hydrocarbons (HC) are present in the exhaust gas as reducing agents. Various specific measures for controlling the air/fuel ratio, also known as the air ratio $\lambda$ for short, have already been proposed for this purpose, cf. for example the laid-open specifications EP 0 560 991 A1 and DE 196 26 835 A1. The nitrogen oxide reduction may also take place in a downstream catalytic converter known as a deNOx catalytic converter; it is also possible for hydrocarbons to be metered in downstream of the engine in order to provide the reducing agents, cf. for example the laid-open specifications EP 0 540 280 A1 and EP 0 573 672 A1.

A number of problem points need to be borne in mind during this alternating adsorption/desorption operation. For example, considerable quantities of the polluting gas ammonia ($NH_3$) may form through reaction of hydrogen with nitrogen monoxide and/or nitrogen dioxide may form in the regeneration phase, depending on the catalytic converter temperature, the exhaust gas composition and the material composition of the nitrogen oxide storage catalytic converter. When switching from a lean exhaust gas atmosphere to a rich exhaust gas atmosphere, there is the risk of an undesirable breakthrough of nitrogen oxides on account of sudden decomposition of nitrates if suitable quantities of reducing agent are not provided quickly enough. When switching from a rich exhaust gas atmosphere to a lean exhaust gas atmosphere, the nitrogen oxide storage catalytic converter may be heated as a result of exothermic combustion reactions, with the result that nitrates which have already formed can be decomposed again and can predominantly no longer be stored, which can cause undesirable nitrogen oxide slippage. With this $NO_x$ storage catalytic converter technology, efficient lowering of the levels of nitrogen oxides is restricted to a relatively narrow temperature range, approximately between 200° C. and 400° C., since at lower temperatures it is difficult to oxidize NO to form $NO_2$, and at higher temperatures the nitrates formed can no longer be stably stored in significant quantities, and the thermodynamic equilibrium between NO and $NO_2$ increasingly shifts toward nitrogen monoxide.

A further problem when using sulfur-containing fuels is what is known as sulfur poisoning of the $NO_x$ storage catalytic converter as a result of the accumulation of sulfates, which are more stable than the nitrates and do not decompose during the $NO_x$ regeneration phases. Therefore, special desulfating phases at elevated exhaust-gas temperature and with a rich exhaust gas composition are carried out from time to time in order to remove sulfates, cf. for example laid-open specification DE 198 27 195 A1. During desulfating, the polluting gas hydrogen sulfide ($H_2S$) may form; emission of this gas should be avoided. For this purpose, for example in patent DE 100 25 044 C1, it is proposed that secondary air be fed into the exhaust train during the desulfating phases, in order to oxidize the hydrogen sulfide in a downstream oxidation catalytic converter.

Another known exhaust gas aftertreatment method is the process known as selective catalytic reduction, or SCR for short. In this process, a selectively acting reducing agent, typically ammonia, is added to the exhaust gas in order to reduce nitrogen oxides. The ammonia is temporarily stored in a suitable deNOx catalytic converter, also known as an SCR catalytic converter for short, and is used by the latter to catalytically reduce nitrogen oxides ($NO_x$) contained in the exhaust gas to form nitrogen and water. The effectiveness of SCR catalytic converters is highly dependent on the $NO/NO_2$ ratio at low temperatures, with a maximum efficiency at an $NO_2$ level of approx. 50% for temperatures below 200° C. and a greatly reduced efficiency if the $NO_2$ level is lower. At higher temperatures above approx. 400° C., the nitrogen oxide reduction is limited by oxidation of ammonia, and moreover the ammonia storage capacity of the SCR catalytic converter decreases as the temperature rises. The overall result for SCR systems of this type is that the temperature window which is suitable for efficiently lowering the levels of nitrogen oxides is from approximately 250° C. to approximately 550° C. SCR catalytic converters are subject to thermal aging and should not be exposed to temperatures of over approximately 700° C. to 750° C. At low temperatures, SCR catalytic converters may also temporarily store unburnt hydrocarbons, and even when the exhaust gas composition is rich, given a suitable design, they may oxidize hydrocarbons, in particular if they contain vanadium oxide ($V_2O_5$) as a catalytic material.

To provide the ammonia in the exhaust gas, it is known to introduce urea, from which ammonia is formed through hydrolysis or thermolysis. One problem in this context, in particular for vehicle applications, is that a corresponding supply of urea has to be carried around. Therefore, as an alternative, internal generation of ammonia has already been proposed. For this purpose, it is proposed in laid-open specifications WO 97/17532 A1 and DE 199 49 046 A1 that an ammonia-generating catalytic converter and, downstream of the latter, an ammonia storage and nitrogen oxide reduction catalytic converter be provided, preferably with the addition of an oxygen storage catalytic converter between the two catalytic converters mentioned above or downstream of the ammonia storage catalytic converter and the nitrogen oxide reduction catalytic converter.

Laid-open specification EP 0 878 609 A1 has described an exhaust gas aftertreatment installation of the generic type, in which an $NO_x$ storage catalytic converter and, downstream of the latter, an SCR catalytic converter are arranged in the exhaust train. As an alternative or in addition to a three-way catalytic converter, the $NO_x$ storage catalytic converter can be designed to form ammonia when the engine is briefly operated under rich-burn conditions, which is realized by an afterinjection of fuel into at least some of the engine combustion chambers. With this type of internal generation of ammonia, there is a risk of the quantity of ammonia which is generated exceeding the ammonia storage capacity of the SCR catalytic converter, resulting in undesirable ammonia slippage.

The exhaust gas aftertreatment measures described above do not lower the levels of particles, in particular of carbon particulates. It is known to use particulate filters to do this. Carbon particulates which have collected in the particulate filter can be burnt off at elevated temperature in the presence of oxygen. A standard measure for heating the particulate filter consists in introducing fuel into the exhaust gas, for example by an afterinjection, and burning this fuel in an oxidation catalytic converter connected upstream of the particulate filter. What are known as CRT systems with continuous particulate filter regeneration are also known, cf. for example U.S. Pat. No. 4,902,487. In these systems, nitrogen dioxide is formed from NO at the oxidation catalytic converter and oxidizes the carbon particulates which have collected in the particulate filter.

To lower the levels of particulate and nitrogen oxides, laid-open specification DE 199 21 974 A1 describes an exhaust gas aftertreatment installation having an oxidation catalytic converter, a downstream $NO_x$ storage catalytic converter and a particulate filter downstream of the $NO_x$ storage catalytic converter or between the oxidation catalytic converter and the $NO_x$ storage catalytic converter. In the case of the former arrangement, the oxidation catalytic converter promotes the function of the $NO_x$ storage catalytic converter through the formation of $NO_2$, but it is not possible to achieve a CRT effect for the particulate filter, since the nitrogen oxides are already being reduced to nitrogen upstream of the particulate filter. If the oxidation catalytic converter is used to heat the particulate filter by combustion of afterinjected fuel, this arrangement results in a high thermal loading of the $NO_x$ storage catalytic converter and a relatively high fuel consumption. In the other arrangement described, the exhaust gas upstream of the $NO_x$ storage catalytic converter predominantly contains NO and only a small amount of $NO_2$, since the latter is converted into NO by the CRT effect, with the result that the storage characteristics of the $NO_x$ storage catalytic converter deteriorate. If the oxidation catalytic converter in this arrangement is used for desulfating-heating of the $NO_x$ storage catalytic converter through combustion of afterinjected fuel, the high heat capacity and the heat transfer in the intervening exhaust train section means that a relatively high temperature has to be reached at the oxidation catalytic converter, which can lead to thermal aging effects in the latter.

The invention is based on the technical problem of providing an exhaust gas aftertreatment installation of the type described in the introduction and an associated exhaust gas aftertreatment method with which as many of the following demands as possible can be satisfied to a high degree with relatively little outlay: effective reduction of nitrogen oxides in a wide temperature range, no need for an additional reducing agent operating medium, avoidance of ammonia and hydrogen sulfide emissions, minimal particulate emissions, particulate oxidation through $NO_2$ reaction, minimal CO and HC emissions, relatively low thermal loading of all the components used to purify the exhaust gas, minimal increased fuel consumption and a low demand for installation space.

The invention solves this problem by providing an exhaust gas aftertreatment installation for the aftertreatment of an exhaust gas generated by a combustion device, in particular a motor vehicle internal combustion engine, having a nitrogen oxide storage catalytic converter and an SCR catalytic converter with the ability to store ammonia, which is arranged downstream of the nitrogen oxide storage catalytic converter or integrated with the latter in a common catalytic converter unit.

The invention also solves this problem by providing a method for the aftertreatment of an exhaust gas generated by a combustion device, in particular a motor vehicle internal combustion engine, in which nitrogen oxides contained in the exhaust gas are temporarily stored in a nitrogen oxide storage catalytic converter during adsorption operating phases of the latter and are released again from the nitrogen oxide storage catalytic converter during regeneration operating phases of the latter, with ammonia being generated, and ammonia which is generated is temporarily stored in a downstream SCR catalytic converter and is used for nitrogen oxide reduction, characterized in that the recorded nitrogen oxide content of the exhaust gas downstream of the SCR catalytic converter and/or downstream of the nitrogen oxide storage catalytic converter and/or the ammonia loading of the SCR catalytic converter is used as a criterion for the instant at which a regeneration operating phase is triggered for the nitrogen oxide storage catalytic converter can further include the following step wherein nitrogen oxides contained in the exhaust gas are temporarily stored in a nitrogen oxide storage catalytic converter during adsorption operating phases of the latter and are released again from the nitrogen oxide storage catalytic converter during regeneration operating phases of the latter, with ammonia being generated, and ammonia which is generated is temporarily stored in a downstream SCR catalytic converter and is used for nitrogen oxide reduction, characterized in that a desired ammonia generation quantity which is to be generated during a current regeneration operating phase of the nitrogen oxide storage catalytic converter is determined, and the subsequent regeneration operating phase is carried out as a function of the desired ammonia generation quantity determined.

In addition to a nitrogen oxide storage catalytic converter and an SCR catalytic converter connected downstream of it, the exhaust gas aftertreatment installation additionally includes a particulate filter and/or an $NO_2$-producing catalytic converter arranged upstream of the SCR catalytic converter.

The nitrogen oxide storage catalytic converter allows the levels of nitrogen oxides to be effectively lowered, in particular even in the case of lean-burn internal combustion engines. By virtue of its $NH_3$ storage capacity, the downstream SCR catalytic converter prevents undesired emission of ammonia generated by the $NO_x$ storage catalytic converter. At the same time, the SCR catalytic converter is able to use stored ammonia to reduce any nitrogen oxide which may still be present in the exhaust gas downstream of the NO$_x$ storage catalytic converter, with the ammonia being oxidized at the same time. This effect can be exploited to deliberately form ammonia at the nitrogen oxide storage catalytic converter, in order for this ammonia to be used as reducing agent in the SCR catalytic converter. As a result, the effective lowering of the levels of nitrogen oxides can be maintained even during periods in which the temperature of the NO$_x$ storage catalytic converter is temporarily outside its range in which it has a conversion activity, for example as a result of the exothermicity following a transition from a lean exhaust gas composition to a rich exhaust gas composition.

If nitrogen oxides are still present in the exhaust gas downstream of the NO$_x$ storage catalytic converter, these nitrogen oxides are generally in the form of NO; the NO$_2$ content is much lower, amounting, for example, to at most 20%. However, at low temperatures below 300° C., the efficiency of the SCR catalytic converter is highest approximately at an NO$_2$ level of 50%, and significantly reduced where the NO$_2$ level is lower. To increase the efficiency of the SCR catalytic converter, the NO$_2$-producing catalytic converter may be connected upstream of it. This catalytic converter may have a relatively small volume and may have a coating which, inter alia, contains a precious metal (e.g. platinum) and is able to increase the NO$_2$ level in the NO$_x$ emission to at least approximately 50% at least in a temperature range from approximately 200° C. to 350° C. One particular feature of the coating of the NO$_2$-producing catalytic converter is its property of deliberately not oxidizing ammonia which is generated in the NO$_x$ storage catalytic converter when operating at $\lambda<1$, but rather allowing this ammonia to pass through in unchanged form. This can be achieved, for example, by the coating not containing an oxygen-storing component.

In a corresponding control unit, which can also be used, for example, to control the combustion device, such as an internal combustion engine, it is preferable to implement functions which decide on the need for and feasibility of targeted generation of NH$_3$ and preset the operating parameters, in particular the duration and extent of enrichment during NSC regeneration, in a suitable way. The formation of NH$_3$ can typically be boosted by a lower air ratio and a longer regeneration time, provided that the temperature of the NO$_x$ storage catalytic converter is in the range in which NH$_3$ formation is possible. Furthermore, operation of the combustion device during NSC regeneration can be set in a manner known per se such that high untreated NO$_x$ emissions from the combustion device result, and as a result the formation of NH$_3$ at the NO$_x$ storage catalytic converter is boosted further.

It has been found that the SCR catalytic converter can also be used to avoid H$_2$S emission, produced, for example, during desulfating. Tests have shown that an SCR catalytic converter, on account of its specific properties, can oxidize hydrogen sulfide formed during the desulfating to form SO$_2$ even at a rich exhaust gas composition ($\lambda<1$). This makes it possible to avoid unpleasant odor pollution.

As a further particular feature, SCR catalytic converters, provided that they contain vanadium oxide, can even oxidize unburnt hydrocarbons (HC) during rich conditions ($\lambda<1$). This makes it possible to reduce the extent to which reducing agent breaks through during NSC regeneration. In particular, by way of example, it is possible to lower the emission levels of possibly carcinogenic hydrocarbons, such as benzene, toluene, ethylbenzene and xylene, which can form under rich conditions at the NO$_x$ storage catalytic converter. On account of its ability to store hydrocarbons even at low temperatures, the SCR catalytic converter can additionally make a contribution to lowering the levels of HC emissions following a cold start. The HC which have been stored at low temperatures are released again at higher temperatures and can be oxidized at the SCR catalytic converter or a downstream oxidation catalytic converter.

A particulate filter can be used for lowering the levels of particulates downstream of the engine. This particulate filter highly efficiently retains the particulates emitted. As is customary, the particulates which have collected can be burnt off at regular intervals by increasing the temperature to over 600° C. If the exhaust gas reaching the particulate filter contains NO$_2$, particulate oxidation also takes place even in the temperature range between approximately 250° C. and 400° C. as a result of reaction with NO$_2$ (CRT effect). The particulate filter may generally be catalytically coated, in which case the coating may contain components such as a precious metal (e.g. platinum) and a washcoat.

The maximum thermal loading of the individual components can be adapted to the specific requirements by using a suitable arrangement of the components. Moreover, by using a suitable arrangement it is possible to ensure that the temperatures of the individual components are within a range which is expedient for the corresponding function when the vehicle is driving. The rich-burn operation which is required for the regeneration of the NO$_x$ storage catalytic converter can be realized by engine-internal measures or additional introduction of reducing agent (e.g. fuel or hydrogen) downstream of the engine.

The heating of the NO$_x$ storage catalytic converter for desulfating purposes and of the particulate filter for thermal regeneration purposes can be effected by engine-internal measures, including afterinjection of fuel. In addition to the deliberately increased exhaust gas temperature, incompletely burnt hydrocarbons which remain in the exhaust gas lead to additional exothermicity at a catalytic converter optionally arranged close to the engine, with the result that the exhaust gas temperature is increased further. In addition or as an alternative, it is also possible for reducing agent (e.g. fuel or hydrogen) to be supplied in the exhaust train directly upstream of the component(s) to be heated or upstream of an oxidation catalytic converter connected upstream of these components. This has the advantage that the heat losses involved in heating further upstream components and heat losses resulting from cooling in the exhaust pipe are reduced. This restricts the outlay on energy and therefore the increased fuel consumption for the heating to a minimum. A further advantage is that in this way further upstream components are not subjected to high exhaust gas temperatures, and consequently the thermal aging of these components can be restricted to a minimum. Moreover, this prevents further upstream components, e.g. an upstream NO$_x$ storage catalytic converter, from leaving the temperature window required for high efficiency as a result of the heating.

In the case of a catalytically coated particulate filter, a further advantage is that the conversion of fuel, on account of the high heat capacity of the particulate filter, continues to be possible even, for example, after prolonged overrun phases of the internal combustion engine with a low exhaust gas temperature. By contrast, when using a conventional catalytic converter, there is a risk that, on account of the low heat capacity, the temperature will drop below the light-off temperature under comparable conditions, meaning that catalytic conversion of the hydrocarbons will no longer be possible. In general terms, other heating methods are possible as an alternative to supplying reducing agent (e.g.

hydrogen or fuel) upstream of a catalytic converter. These other methods are not expressly mentioned below but can be used instead of supplying reducing agent downstream of the engine. In this context, by way of example, mention may be made of an electrically heated catalytic converter, electrical heating of the particulate filter or the use of a burner as standard conventional measures.

The supply of reducing agent downstream of the engine and upstream of the $NO_x$ storage catalytic converter can also be utilized to set rich conditions for NSC regeneration when the engine is operating with lean exhaust gas. This is preferably implemented when the engine is operating between $\lambda=1.0$ and $\lambda=1.2$, since otherwise the quantity of reducing agent to be supplied is too great. This results in the advantage that high untreated $NO_x$ emission usually occurs in the range between $\lambda=1.0$ and $\lambda=1.2$, whereas the level of untreated $NO_x$ emissions is considerably lower at air ratios of $\lambda<1$. Consequently, this method can be used to achieve a high level of $NO_x$ emission and therefore extensive formation of $NH_3$ during NSC regeneration.

To avoid high emissions of CO and HC during NSC regeneration operations with $\lambda<1$, if necessary secondary air can be blown in ahead of a downstream oxidation catalytic converter. The secondary air can, for example, be provided by an electrically driven secondary air pump or a compressor or, in the case of supercharged engines can be removed downstream of the compressor.

It is possible to considerably reduce the overall space taken up by optionally combining or integrating two of the abovementioned functionalities in one component, for example, by applying a catalytic coating to a particulate filter.

In further configurations, the exhaust gas aftertreatment installation contains one or more $NO_x$ sensors downstream of the $NO_x$ storage catalytic converter and/or the SCR catalytic converter, and/or means for recording the temperature of one or more of the exhaust gas purification components and/or means for recording the $NH_3$ loading of the SCR catalytic converter.

Various possible implementations are possible for the order in which the $NO_x$ storage catalytic converter, SCR catalytic converter, particulate filter and $NO_2$-producing catalytic converter are arranged in the exhaust train, each of these implementations having specific properties and advantages; the options include multi-flow arrangements.

The basic method described above allows relatively accurate, model-based control of the time at which a regeneration of the nitrogen oxide storage catalytic converter is initiated.

The second method described above allows targeted control of the generation of ammonia during a respective regeneration phase of the nitrogen oxide storage catalytic converter taking account of the current conditions, in particular with regard to the temperatures of the ammonia-generating $NO_x$ storage catalytic converter and of the SCR catalytic converter and/or the ammonia loading of the SCR catalytic converter; a variable quantity of ammonia which is to be generated during the current regeneration phase of the $NO_x$ storage catalytic converter can be predetermined as a function of the operating state which has been ascertained.

In one configuration of this method, the results of the determination as to whether the exhaust gas air ratio downstream of the $NO_x$ storage catalytic converter has dropped below a threshold value, which is dependent on the quantity of ammonia which it is desired to form, can be used as a criterion for terminating a regeneration phase of the $NO_x$ storage catalytic converter.

In a further configuration of the method according to the invention, an external supply of reducing agent, e.g. downstream of the engine, into the exhaust train can be provided for during the NSC regeneration, in order for the combustion device also to be operated under lean-burn conditions during this period, resulting in high untreated $NO_x$ emissions from the combustion device.

In a further configuration of the method, it is possible to provide for secondary air to be fed into the exhaust train at a suitable location during the rich-burn operating phases, in order to oxidize any $NH_3$, $H_2S$, CO and HC which may be present during these operating phases and thereby to prevent corresponding emissions of pollutants.

Advantageous embodiments of the invention are illustrated in the drawings and described below.

BRIEF DESCRIPTION OF THE DRAWINGS

FIG. 5 shows a schematic block diagram illustration in accordance with FIG. 1, but for a modified internal combustion engine with a two-flow exhaust train and associated two-flow exhaust gas aftertreatment installation.

DETAILED DESCRIPTION OF THE DRAWINGS

Figure 1:
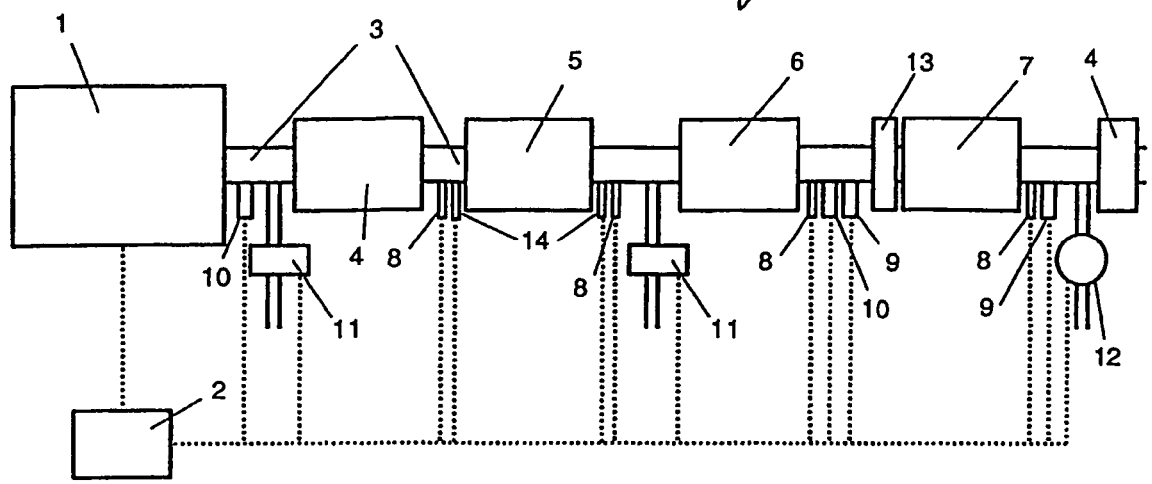
FIG. 1 shows a schematic block diagram illustration of an internal combustion engine of a motor vehicle with connected single-flow exhaust gas aftertreatment installation, which includes, connected in series, a first oxidation catalytic converter, a particulate filter, an $NO_x$ storage catalytic converter, an $NO_2$-producing catalytic converter, an SCR catalytic converter and a second oxidation catalytic converter.

The exhaust gas aftertreatment installation illustrated in FIG. 1 includes, downstream of an internal combustion engine 1, as seen in the direction of flow of the exhaust gas, in an exhaust train 3, the following successive components: an oxidation catalytic converter 4, a particulate filter 5, an $NO_x$ storage catalytic converter 6, an $NO_2$-producing catalytic converter 13, an SCR catalytic converter 7 and a further oxidation catalytic converter 4 as exhaust gas purification components. A control unit 2 is used to control the internal combustion engine 1, which may, for example, be a standard diesel or spark-ignition engine, and the exhaust gas aftertreatment installation. Furthermore, there are temperature sensors 8, $NO_x$ sensors 9, lambda sensors 10, devices 11 for supplying reducing agent downstream of the engine, a device 12 for supplying secondary air and pressure sensors 14 provided at suitable locations in the exhaust train 3, as shown.

The internal combustion engine 1 delivers exhaust gas containing, inter alia, $NO_x$ particulates, CO and HC. During standard lean-burn operation of the internal combustion engine 1, CO and HC are oxidized at the oxidation catalytic converter 4 to form $CO_2$ and $H_2O$. Moreover, some of the NO contained in the exhaust gas is oxidized to form $NO_2$. The particulates which are present in the exhaust gas are retained in the particulate filter 5. Some of the carbon particulates which have collected in the particulate filter 5 are oxidized by reaction with $NO_2$, with $NO_2$ being reduced to NO. The nitrogen oxides contained in the exhaust gas are stored in the $NO_x$ storage catalytic converter 6. If nitrogen oxides are still present in the exhaust gas downstream of the $NO_x$ storage catalytic converter 6, these nitrogen oxides are generally in the form of NO; the $NO_2$ level is significantly lower, amounting, for example, to at most 20%. However, the efficiency of the SCR catalytic converter 7 at low temperatures below 300° C. is highest at an $NO_2$ level of approximately 50% and is significantly reduced if the level of $NO_2$ is lower. Therefore, the $NO_2$-producing catalytic converter 13 is connected upstream of the SCR catalytic converter 7. This catalytic converter 13 has a coating which contains, inter alia, precious metal (e.g. platinum) and is able to increase the level of $NO_2$ in the total emission of $NO_x$ to at least approximately 50%, at least in a temperature range from approximately 200° C. to 350° C. One particular feature of the coating of the $NO_2$-producing catalytic converter is its ability of deliberately not oxidizing ammonia generated in the $NO_x$ storage catalytic converter during operation at $\lambda<1$ but rather allowing this ammonia to pass through in unchanged form. This can be achieved, for example, by the coating not containing any oxygen-storing components. The SCR catalytic converter 7 is able to reduce the nitrogen oxide with the aid of $NH_3$ stored therein. In this case, the efficiency at temperatures below 300° C. is increased by the $NO_2$-producing catalytic converter 13 connected upstream.

Heating measures can be employed to ensure that sufficient temperatures are reached at all the components, in particular at the $NO_x$ storage catalytic converter 6 and SCR catalytic converter 7, even during low-load operation, and thereby to ensure optimum lowering of the levels of $NO_x$. These heating measures may be engine-internal, e.g. a shift towards the late position for the main injection or an afterinjection, or may take place downstream of the engine, as a result of reducing agent being supplied upstream of the $NO_x$ storage catalytic converter, in order to generate exothermicity, provided that the $NO_x$ storage catalytic converter 6 has reached a sufficient temperature to convert the reducing agent. Further measures for increasing the exhaust gas temperature may include, increasing the idling speed, lengthening the afterglow time, connecting up additional electrical consumers or increasing the EGR rate. The above-mentioned heating measures can be controlled, for example, by the control unit 2 as a function of the incoming temperature sensor signals or by means of a model. The exhaust pipe 3 may be thermally insulated in order to minimize heat losses from the exhaust gas. By way of example, it is possible to use an air gap insulation.

NSC regenerations are required at regular intervals. The times for regeneration operations are determined with the aid of the $NO_x$ sensor 9 downstream of the SCR catalytic converter. The signal from the $NO_x$ sensor 9 is recorded and assessed in the control unit 2. If the breakthrough of $NO_x$ is unacceptably high, for example if it exceeds a certain proportion of the untreated $NO_x$ emissions (e.g. $NO_x$ content downstream of $NO_x$ storage catalytic converter >10% of the untreated $NO_x$ emissions), the control unit 2 requests an NSC regeneration. If criteria which are taken into account in the control unit 2 and are a precondition on the engine side for an NSC regeneration to be realized are satisfied, for example, operation in a specific part of the operating range of the engine 1 in which NSC regeneration can be effected, the NSC regeneration is initiated.

Models for the untreated $NO_x$ emission, the $NO_x$ storage capacity of the $NO_x$ storage catalytic converter 6, the $NH_3$ formation at the $NO_x$ storage catalytic converter and the $NH_3$ storage in the SCR catalytic converter 7 are stored in the control unit 2. These models can be used to assess the $NO_x$ sensor signal downstream of the SCR catalytic converter and can also be used for diagnostic purposes. The models can be adapted to the current state of aging of the catalytic converters on the basis of the sensor signals. Alternatively, the aging state can be diagnosed by comparing the sensor signals from the $NO_x$ sensors 9 and/or the lambda sensors 10 with the modeled behavior of the catalytic converters, without, however, adapting the model.

As an alternative to considering the $NO_x$ signal downstream of the SCR catalytic converter, or as an additional option, it is possible to request an NSC regeneration when the modeled SCR loading with $NH_3$ drops below a relative value, e.g. 5% of the possible $NH_3$ loading, or an absolute value, e.g. 0.1 g of $NH_3$.

As an alternative to considering the $NO_x$ signal downstream of the SCR catalytic converter, it is also possible to consider the signal from the $NO_x$ sensor 9 downstream of the $NO_x$ storage catalytic converter. This can be assessed in a similar way to the procedure described above and can be used as a criterion to demand an NSC regeneration.

Alternatively the signal from the $NO_x$ sensor 9 downstream of the $NO_x$ storage catalytic converter can be used as an input variable for the NSC model in the control unit 2. The nitrate loading of the $NO_2$ storage catalytic converter 6 can be calculated with the aid of the model, thereby allowing the $NH_3$ formation to be estimated taking the aging into account. Since the $NH_3$ loading of the SCR catalytic converter 7 is likewise calculated by means of a model, it is possible to request an NSC regeneration if the modeled SCR loading with $NH_3$ drops below a relative value, e.g. 5% of the possible $NH_3$ loading, or an absolute value, e.g. 0.1 g of $NH_3$.

In principle, it is also possible to use both $NO_x$ sensors 9, in which one sensor, as described above, delivers a criterion for requesting an NSC regeneration and the second $NO_x$ sensor is used to diagnose and adapt the catalytic converter model in the control unit 2. In addition, an $NH_3$ sensor (not shown in FIG. 1) can be provided downstream of the $NO_x$ storage catalytic converter and also downstream of the SCR catalytic converter; the signal from this $NH_3$ sensor can be used to adapt the models of the $NO_x$ storage catalytic converter 6 and the SCR catalytic converter 7 or to control the regeneration parameters.

The control unit 2 includes functions which decide upon the need for and feasibility of controlled generation of $NH_3$ during an impending NSC regeneration and predetermine the operating parameters, in particular the duration and degree of enrichment, accordingly. An important criterion in this respect is the temperatures of the $NO_x$ storage catalytic converter 6 and of the SCR catalytic converter 7. The temperatures are determined by the temperature sensors 8 in or downstream of the respective components. Alternatively, the temperature of the SCR catalytic converter 7 can be calculated on the basis of the measured temperature downstream of the $NO_x$ storage catalytic converter, with the aid of a model in the control unit 2, so that there is no need for the sensor 8 downstream of the SCR catalytic converter. In addition to the temperatures of the $NO_x$ storage catalytic converter 6 and of the SCR catalytic converter 7, it is also possible, for example, for the current $NH_3$ loading, calculated by model means, of the SCR catalytic converter 7 to be used as a criterion.

If the temperatures of the $NO_x$ storage catalytic converter 6 and of the SCR catalytic converter 7 are within predetermined ranges, the current $NH_3$ loading of the SCR catalytic converter 7 is low and any further conditions are satisfied, maximum formation of $NH_3$ is desired. If the temperature of the $NO_x$ storage catalytic converter 6 is outside the predetermined range, which may, for example, be between 230° C. 370° C., formation of $NH_3$ is not possible or is only possible to a limited extent and is therefore also not aimed for. This avoids unnecessarily increased fuel consumption and high levels of HC and CO emissions on account of the regeneration lasting too long. If the temperature of the SCR catalytic converter 7 is outside the predetermined range, which may, for example, be between 200° C. and 450° C., formation of $NH_3$ is likewise not aimed for, or only a small amount is aimed for, since either $NH_3$ cannot be sufficiently stored in the SCR catalytic converter 7 and therefore would be emitted or conversion of $NO_x$ at the SCR catalytic converter 7 is scarcely possible. The same applies to the situation in which the current $NH_3$ loading of the SCR catalytic converter 7 is so high that it is impossible for further $NH_3$ to form.

In general, in addition to the current temperatures, in particular in the case of the SCR catalytic converter 7, it is also possible to take account of temperature gradients, e.g. a rapid rise, and/or to implement a temperature prediction. The predicted temperature is then taken into account in addition to the current temperature. By way of example, reduced formation of $NH_3$ is aimed for if a strong increase in the temperature of the SCR catalytic converter 7 is predicted, since otherwise there is a risk of subsequent $NH_3$ desorption in the SCR catalytic converter 7. The state of aging of the $NO_x$ storage catalytic converter 6 is likewise taken into account when deciding on the formation of $NH_3$ which is aimed for, since the reduction of $NO_x$ in the SCR catalytic converter 7 becomes increasingly important with progressive aging of the $NO_x$ storage catalytic converter 7.

The optimum air ratio is defined in the control unit 2 as a function of the $NH_3$ which is aimed for. If it is aimed to form high levels of $NH_3$ an air ratio for maximum formation of $NH_3$ is preset. If this is not the case, an air ratio for the formation of small amounts or no $NH_3$ is preset. Intermediate values for the formation of medium amounts of $NH_3$ are also possible. The air ratio can also be varied continuously or in steps during the NSC regeneration as a function of the temperatures of $NO_x$ storage catalytic converter 6 and SCR catalytic converter 7 and further parameters. By way of example, a lower air ratio can be set at the start and a higher air ratio can be set as regeneration progresses, in order to form high levels of $NH_3$ combined, at the same time, with low emissions of HC and CO during the NSC generation.

The duration of the NSC regenerations is likewise set as a function of the desired formation of $NH_3$. The gradual drop in the air ratio downstream of the $NO_x$ storage catalytic converter 6 to values of lower than $\lambda=1$ is used to this end as a criterion for terminating the NSC regeneration. If it is aimed to form high levels of $NH_3$, the regeneration is terminated as soon as the air ratio determined by the lambda sensor 10 downstream of the $NO_x$ storage catalytic converter drops below a threshold value $\lambda 1$. It is optionally also possible to continue a predetermined time or number of working cycles of the engine 1 beyond this point. If the aim is for no $NH_3$ to be formed, the regeneration is terminated immediately as soon as the air ratio downstream of the $NO_x$ storage catalytic converter drops below a threshold value $\lambda 2$, where $\lambda 2$ is greater than $\lambda 1$. As a result, breakthroughs of HC/CO are substantially avoided and a low increased fuel consumption is achieved. The threshold values can be varied as a function of the NSC aging and further parameters. Intermediate values are also possible in order to achieve the formation of a medium level of $NH_3$.

As soon as the aim is to form high levels of $NH_3$, operation of the engine during NSC regeneration is additionally set in such a way that the untreated $NO_x$ emissions from the engine 1 are as high as possible. This can be effected in combination with a supply of reducing agent downstream of the engine and upstream of the $NO_x$ storage catalytic converter 6. This further boosts the formation of $NH_3$ at the $NO_x$ storage catalytic converter 6. If the aim is for no $NH_3$ formation, by contrast, the engine operation is set in such a way that the untreated $NO_x$ emissions from the engine are as low as possible.

The device 11 arranged upstream of the $NO_x$ storage catalytic converter 6 for supplying reducing agent downstream of the engine is used to heat up the $NO_x$ storage catalytic converter 6 for a desulfating operation. This measure is carried out in addition to measures taken at the engine for heating. The boost provided by the supply of reducing agent downstream of the engine makes it possible to reduce the extent of the measures taken at the engine, so that the thermal aging of the oxidation catalytic converter is reduced. Heating of the $NO_x$ storage catalytic converter 6 exclusively by supplying reducing agent downstream of the engine is not desirable, since the large quantity of reducing agent would generate considerable exothermicity at the $NO_x$ storage catalytic converter 6, which would lead to thermal aging. The quantity of reducing agent supplied is controlled, inter alia, as a function of the following parameters: the desired temperature of the $NO_x$ storage catalytic converter 6, the actual temperature downstream of the particulate filter, the actual temperature downstream of the $NO_x$ storage catalytic converter and the mass flow of exhaust gas.

Furthermore, at least one of the two devices illustrated in FIG. 1 for supplying reducing agent downstream of the engine can be used to maximize the untreated $NO_x$ emissions from the engine 1 during the NSC regeneration. For this purpose, the engine 1 is operated with an air ratio $\lambda > 1$ at which a high $NO_x$ emission level is reached, preferably between $\lambda=1.0$ and $\lambda=1.2$. The supply of reducing agent downstream of the engine allows the air ratio upstream of the $NO_x$ storage catalytic converter to be lowered to $\lambda<1$.

Thermal regenerations of the particulate filter 5 are required at regular intervals. This may be the case, for example, if a high pressure drop at the particulate filter 5 is recorded by the pressure sensors 14 upstream and downstream of the particulate filter, implying unacceptably high loading of the particulate filter 5. The device 11 for supplying reducing agent downstream of the engine which is arranged upstream of the particulate filter 5 and the oxidation catalytic converter 4 connected upstream of the particulate filter 5 can be used to heat the particulate filter 5. This measure is carried out in addition to engine-internal measures for raising the exhaust gas temperature. The boost provided by the supply of reducing agent downstream of the engine makes it possible to reduce the extent of engine-internal measures. It is not desirable for the oxidation catalytic converter 4 and therefore the particulate filter 5 to be heated exclusively by supplying reducing agent downstream of the engine, since the large quantity of reducing agent would generate extensive exothermicity at the oxidation catalytic converter 4, which would lead to thermal aging. The quantity of reducing agent supplied is controlled, inter alia, as a function of the following parameters: the desired temperature of the particulate filter 5, the actual temperature upstream of the particulate filter, the actual temperature downstream of the particulate filter and the mass flow of exhaust gas.

The device 12 for supplying secondary air and the further oxidation catalytic converter 4 are connected downstream of the SCR catalytic converter 7. This oxidation catalytic converter 4 may be significantly smaller and also, for example, have a lower precious metal loading than the oxidation catalytic converter 4 upstream of the particulate filter. The device 12 for supplying secondary air is activated whenever the engine 1 is being operated with $\lambda<1$. Undesirable emissions, such as $NH_3$, $H_2S$ and CO and HC, may form during these phases. These components can be oxidized in the oxidation catalytic converter 4 connected downstream of the device 12 for supplying secondary air, so that emission of these undesirable components is avoided.

For this purpose, the quantity of secondary air supplied is set in such a way that, despite the engine operating at $\lambda<1$, a lean exhaust gas composition ($\lambda>1$) is achieved at the downstream oxidation catalytic converter 4. Inter alia, the signal from at least one lambda sensor 10 and the mass flow of exhaust gas are used in the control unit 2 to control the quantity of secondary air supplied. If the device 12 for supplying secondary air is able to provide sufficient quantities of secondary air only after a certain delay time, it is in each case activated a corresponding time before the changeover to operation with $\lambda<1$.

It is advantageous in this exemplary embodiment that the SCR catalytic converter 7 is protected from high temperatures downstream of the particulate filter during the thermal regeneration of the particulate filter 5, since the length of the exhaust pipe means that the exhaust gas has been considerably cooled by the time it reaches the SCR catalytic converter 7, and moreover, the $NO_x$ storage catalytic converter 6 acts as a heat sink. In this way, the thermal aging of the SCR catalytic converter 7 can be kept at a low level. As a further advantage, the high heat capacity of the particulate filter 5 stabilizes the temperatures of the downstream components even when the vehicle driving conditions are not in a steady state. This ensures that the $NO_x$ storage catalytic converter 6 and the SCR catalytic converter 7 are generally in a favorable temperature range even when the vehicle driving conditions are not in a steady state, and therefore the system operates highly efficiently. Moreover, the risk of undesirable desorption of stored $NH_3$ at the SCR catalytic converter 7 as a result of a rapid increase in temperature is minimized.

The particulate filter 5 may be catalytically coated. The catalytic coating of the particulate filter 5 may be similar to the coating of one of the oxidation catalytic converters 4. As a result, the upstream oxidation catalytic converter 4 can be made smaller or provided with a lower precious metal content, which leads to space and/or cost benefits. If appropriate, the oxidation catalytic converter 4 connected upstream of the particulate filter 5 can also be dispensed with altogether. In this case, the temperature sensor 8 upstream of the particulate filter 5 is likewise removed. Therefore, it is no longer the temperature upstream of the particulate filter, but rather the temperature downstream of the particulate filter which is used as control variable when heating the particulate filter 5 for thermal regeneration. However, the catalytic coating of the particulate filter 5 may also be similar to the coating of the $NO_x$ storage catalytic converter 6. This allows the downstream $NO_x$ storage catalytic converter 6 to be of smaller design, which leads to space and/or cost benefits. If appropriate, it is also possible for the separate $NO_x$ storage catalytic converter 6 to be dispensed with altogether, i.e. for it to be integrated in the particulate filter 5.

It should be noted that at least some of the temperature sensors 8 can also be dispensed with. It is likewise also possible to eliminate some or all of the $NO_x$ sensors 9. In this case, the components contained in the exhaust gas aftertreatment system are modeled in the control unit 2 in such a way that the $NO_x$ concentrations or temperatures which occur at the respective positions are available as output variables of the model. It is also possible for one or both of the devices 11 for supplying reducing agent downstream of the engine to be dispensed with. The device 12 for supplying secondary air and the downstream oxidation catalytic converter 4 can likewise be dispensed with.

The $NO_2$-producing catalytic converter 13 may, as illustrated in FIG. 1, be designed as a separate component. Alternatively, it is also possible for it to be integrated at the outlet end of the $NO_x$ storage catalytic converter 6 or at the inlet end of the SCR catalytic converter 7. Alternatively the $NO_2$-producing catalytic converter 13 can also be dispensed with.

Figure 2:
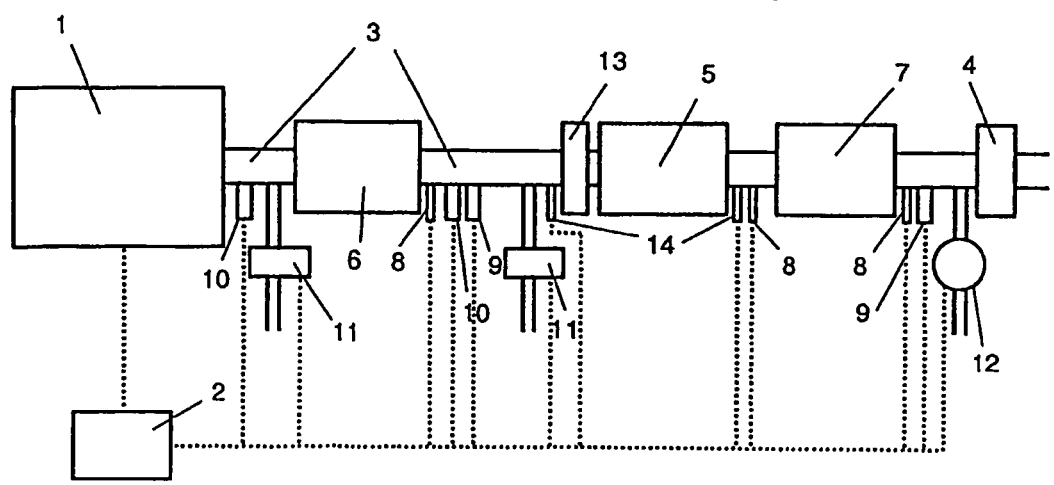
FIG. 2 shows a schematic block diagram illustration in accordance with FIG. 1, but with a modified exhaust gas aftertreatment installation which includes, connected in series, an $NO_x$ storage catalytic converter, an $NO_2$-producing catalytic converter, a particulate filter, an SCR catalytic converter and an oxidation catalytic converter.

The exemplary embodiment shown in FIG. 2 differs from that shown in FIG. 1 in that the $NO_x$ storage catalytic converter 6 forms the first exhaust gas purification component, which is then followed in the downstream direction by the $NO_2$-producing catalytic converter 13, the particulate filter 5, the SCR catalytic converter 7 and the downstream oxidation catalytic converter 4, in the order listed, while the other, upstream oxidation catalytic converter is no longer present. Functionally equivalent components are denoted by the same reference designations in FIG. 2 as in FIG. 1. The following explanations of the exemplary embodiment shown in FIG. 2 can be restricted to the differences which result from the different order of the exhaust gas purification components; otherwise, the properties and advantages which have been explained above in connection with the exemplary embodiment shown in FIG. 1 apply accordingly.

Therefore, in the example shown in FIG. 2, the $NO_x$ storage catalytic converter 6 performs the function of oxidizing CO and HC to form $CO_2$ and $H_2O$ during standard lean-burn operation of the internal combustion engine 1 and to temporarily store a significant proportion of the nitrogen oxides contained in the exhaust gas.

In this case the $NO_2$-producing catalytic converter 13 is connected directly upstream of the particulate filter 5, in order to increase the level of $NO_2$ in the nitrogen oxides which are still present in the exhaust gas downstream of the $NO_x$ storage catalytic converter 6 depending on the operating state, typically from at most 20% to at least approximately 50%. This makes it possible to promote the oxidation of carbon particulates in the particulate filter 5 by reaction with $NO_2$ (CRT effect) and to increase the efficiency of the downstream SCR catalytic converter 7. These effects can be boosted further by admitting a maximum $NO_x$ slippage at the $NO_x$ storage catalytic converter 6, so that the $NO_x$ reduction potential of the SCR catalytic converter 7 can be exploited to its maximum extent. At temperatures below 300° C., the efficiency is also increased by the $NO_2$-producing catalytic converter 13 connected upstream of the particulate filter 5.

In the arrangement shown in FIG. 2, once again, the device 11 for supplying reducing agent downstream of the engine, which is in this case positioned directly upstream of the $NO_2$-producing catalytic converter 13, can be used to heat the particulate filter 5, making it possible to reduce the extent of engine-internal measures required for this purpose, thereby reducing aging effects in the $NO_x$ storage catalytic converter 6. It is not desirable to heat the $NO_2$-producing catalytic converter 13 purely by the supply of reducing agent downstream of the engine, on account of thermal aging effects in this catalytic converter. The quantity of reducing agent supplied is controlled inter alia as a function of the following parameters: the desired temperature of the particulate filter 5, the actual temperature upstream of the $NO_2$-producing catalytic converter and downstream of the $NO_x$ storage catalytic converter, the actual temperature downstream of the particulate filter and the mass flow of exhaust gas.

An advantage of the exemplary embodiment shown in FIG. 2 is that the $NO_x$ storage catalytic converter 6, on account of being positioned close to the engine, reaches the required operating temperature soon after a cold start. This means that few measures are required to erase the exhaust gas temperature. This reduces the increased fuel consumption resulting from heating measures. Furthermore, in this exemplary embodiment, the SCR catalytic converter 7 is protected from high temperatures during the desulfating of the $NO_x$ storage catalytic converter 6, since the length of the exhaust pipe results in considerable cooling of the exhaust gas by the time it reaches the SCR catalytic converter 7, and in addition, the particulate filter 5 and the $NO_2$-producing catalytic converter 13 act as heat sinks. In this way, the thermal aging of the SCR catalytic converter 7 can be kept at a low level. As a further advantage, the high heat capacity of the particulate filter 5 leads to stabilization of the temperature of the downstream SCR catalytic converter 7 even when the vehicle driving operation is not in a steady state. This ensures that the SCR catalytic converter 7 is generally in a suitable temperature range, and therefore works with a high level of efficiency, even when the vehicle driving operation is not in a steady state. In addition, the risk of undesirable desorption of stored $NH_3$ at the SCR catalytic converter 7 as a result of a rapid increase in temperature is minimized.

The particulate filter 5 may be catalytically coated. The catalytic coating of the particulate filter 5 may be similar to the coating of the $NO_2$-producing catalytic converter 13. As a result, the upstream $NO_2$-producing catalytic converter 13 can be made smaller or given a lower precious metal content, which leads to space and/or cost benefits. If appropriate, it is also possible for the $NO_2$-producing catalytic converter connected upstream of the particulate filter 5 to be dispensed with altogether.

However, the catalytic coating of the particulate filter 5 may also be similar to the coating of the $NO_x$ storage catalytic converter 6. This allows the $NO_x$ storage catalytic converter 6 arranged close to the engine to be of smaller design, which leads to space and/or cost benefits. If appropriate, it is also possible for the separate $NO_x$ storage catalytic converter 6 to be dispensed with altogether, i.e. for its function to be integrated in the particulate filter 5. In this case, it is also possible for both the $NO_2$-producing catalytic converter 13 and the device 11 for supplying reducing agent downstream of the engine and upstream of the $NO_2$-producing catalytic converter 13 to be dispensed with. However, the pressure sensor 14 illustrated upstream of the particulate filter is retained, and the $NO_x$ sensor 9, illustrated downstream of the $NO_x$ storage catalytic converter 6 in FIG. 2, and the lambda sensor 10 are then positioned downstream of the particulate filter 5.

Furthermore, the catalytic coating may also be similar to the coating of the downstream SCR catalytic converter 7. This allows the SCR catalytic converter 7 to be of smaller design, which leads to space and/or cost benefits. If appropriate, the SCR catalytic converter as a separate component can also be dispensed with altogether. In this case, the temperature sensor 8 illustrated in FIG. 2 between particulate filter and SCR catalytic converter can be dispensed with, but the pressure sensor 14 illustrated downstream of the particulate filter is retained.

Instead of being arranged upstream of the particulate filter 5, the $NO_2$-producing catalytic converter 13 may also be integrated at the outlet end of the $NO_x$ storage catalytic converter 6. Alternatively, the $NO_2$-producing catalytic converter 13 may also be arranged upstream of the SCR catalytic converter 7. As a further possible option, it is also possible for the $NO_2$-producing catalytic converter 13 to be integrated at the inlet end of the SCR catalytic converter 7. Alternatively, the $NO_2$-producing catalytic converter 13 can also be dispensed with altogether.

Although this is not illustrated in FIG. 2, it is additionally possible for a further oxidation catalytic converter to be connected upstream of the $NO_x$ storage catalytic converter 6, which can further lower the emissions of HC and CO in particular during a cold start.

Figure 3:
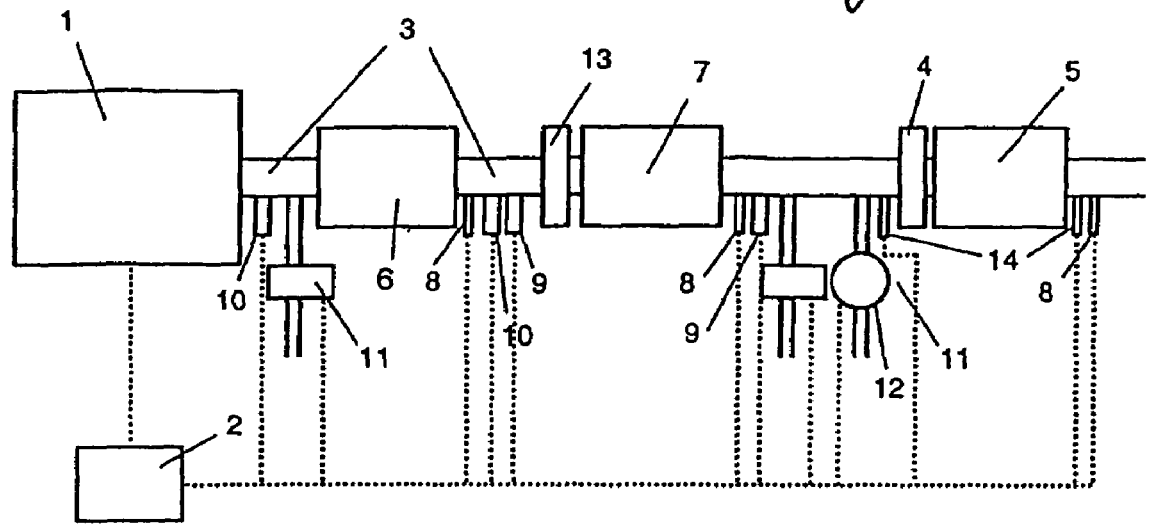
FIG. 3 shows a schematic block diagram illustration in accordance with FIG. 1, with a modified exhaust gas aftertreatment installation, which includes, connected in series, an $NO_x$ storage catalytic converter, an $NO_2$-producing catalytic converter, an SCR catalytic converter, an oxidation catalytic converter and a particulate filter.

As a further variant, FIG. 3 shows an exhaust gas aftertreatment installation which differs from that shown in FIG. 2 by virtue of the fact that the positions of particulate filter 5 and SCR catalytic converter 7 are switched, and the oxidation catalytic converter 4 is connected directly upstream of the particulate filter 5. Moreover, the other components, i.e. the various sensors 8, 9, 10, 14, the devices 11 for supplying reducing agent downstream of the engine and the secondary air feed device 12 are arranged at modified positions suitably matched to the associated exhaust gas purification components 4 to 7, 13 in the exhaust train 3, in the same way as was the case in the example shown in FIG. 2 with respect to that shown in FIG. 1. As in the exemplary embodiment explained above with reference to FIG. 2, the following text will deal only with those measures and resulting effects of the example shown in FIG. 3 which differ from those of the examples shown in FIGS. 1 and 2, while otherwise reference can be made, in connection with the corresponding functions and properties to the statements made above in connection with the examples illustrated in FIGS. 1 and 2.

The $NO_2$-producing catalytic converter 13, which in the example shown in FIG. 3 is connected directly upstream of the SCR catalytic converter 7, once again allows the efficiency of the SCR catalytic converter 7 to be noticeably increased, in particular in the temperature range below 300° C.

In this case, the device 11 for supplying reducing agent downstream of the engine which is connected upstream of the oxidation catalytic converter 4 before the particulate filter 5 can be used to heat the particulate filter 5. In this arrangement, the $NO_x$ storage catalytic converter 6 and the SCR catalytic converter 7 are not thermally loaded by this measure. Heating of the particulate filter exclusively by the supply of reducing agent downstream of the engine is not desirable, in order not to cause excessive thermal aging of the oxidation catalytic converter 4. The quantity of reducing agent supplied is controlled, inter alia, as a function of the following parameters: the desired temperature of the particulate filter 5, the actual exhaust gas temperature upstream of the oxidation catalytic converter 4 or downstream of SCR catalytic converter 7, the actual exhaust gas temperature downstream of the particulate filter 5 and the mass flow of exhaust gas.

An advantage of the example shown in FIG. 3 is that in addition to the $NO_x$ storage catalytic converter 6, the SCR catalytic converter 7, by virtue of its position downstream of the $NO_x$ storage catalytic converter 6, reaches the required operating temperature relatively quickly after a cold start. A further advantage is that there is no need for an additional oxidation catalytic converter as a final component of the system in order to oxidize the undesirable exhaust gas components by blowing in secondary air. Moreover, in this exemplary embodiment the SCR catalytic converter 7 is protected from high temperatures during the thermal regeneration of the particulate filter 5, since it is positioned upstream of the particulate filter 5.

The particulate filter 5 may be catalytically coated, in which case the catalytic coating may be similar to that of the upstream oxidation catalytic converter 4, so that the latter can be made smaller or given a lower precious metal content, which leads to space and/or cost benefits. It is optionally also possible for the oxidation catalytic converter connected upstream of the particulate filter 5 to be dispensed with altogether.

The $NO_2$-producing catalytic converter 13 may, as shown in FIG. 3, be designed as a separate component. Alternatively, it may be integrated into the relevant component at the outlet end of the $NO_x$ storage catalytic converter 6 or at the inlet end of the SCR catalytic converter 7 or may be dispensed with altogether. In an embodiment which is not illustrated, it is possible for a further oxidation catalytic converter to be connected upstream of the $NO_x$ storage catalytic converter 6, which can further reduce the HC and CO emissions in particular during a cold start.

Figure 4:
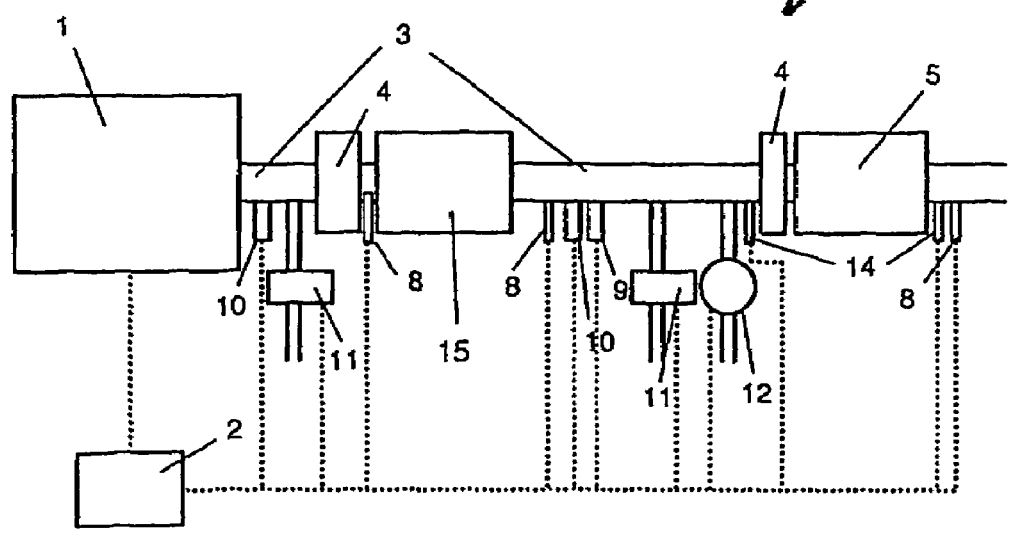
FIG. 4 shows a schematic block diagram illustration in accordance with FIG. 1, but with a modified exhaust gas aftertreatment installation, which includes a first oxidation catalytic converter, an integrated nitrogen oxide storage and SCR catalytic converter, a second oxidation catalytic converter and a particulate filter.

FIG. 4 shows a further variant, in which the exhaust gas aftertreatment installation has a combined SCR and nitrogen oxide storage catalytic converter 15, which combines the functions of the $NO_x$ storage catalytic converter 6 and the SCR catalytic converter 7 from the examples shown in FIGS. 1 to 3. An oxidation catalytic converter 4 is connected directly upstream of both this integrated catalytic converter 15 and the downstream particulate filter 5. The other components in accordance with the examples shown in FIGS. 1 to 3 have been arranged suitably for the positioning of these exhaust gas purification components 4, 5, 15, as shown.

The integrated catalytic converter 15 can be realized, for example, by using an SCR catalytic converter which is produced as an unsupported extrudate, with the catalytic material of the SCR catalytic converter serving as a support for a further catalytic coating, specifically a nitrogen oxide storage catalyst coating. Alternatively, it is also possible, in the case of an SCR catalytic converter which is not produced as an unsupported extrudate, to apply a nitrogen oxide storage catalyst coating in addition to the SCR coating. In any case, it is advantageous that this measure considerably reduces the space required. Moreover, both functional components reach the required operating temperature very soon after a cold start, which means that scarcely any additional heating measures, which would increase the fuel consumption, are required.

During standard lean-burn operation of the internal combustion engine 1, CO and HC are oxidized at the oxidation catalytic converter 4 close to the engine, to form $CO_2$ and $H_2O$. A significant proportion of the nitrogen oxide contained in the exhaust gas is temporarily stored in the integrated nitrogen oxide storage and SCR catalytic converter 15, while the remainder is reduced by ammonia which is temporarily stored therein.

In the example shown in FIG. 4, the times of NSC regenerations are determined with the aid of the $NO_x$ sensor 9 downstream of the integrated, combined catalytic converter 15, or alternatively by one of the other methods described above. In this case, the models stored in the control unit 2 comprise a model relating to the nitrogen oxide storage properties, the ammonia storage properties and the ammonia generation properties of the combined catalytic converter 15.

In the example shown in FIG. 4, the temperature of the combined catalytic converter 15, which can be recorded by the downstream temperature sensor 8, is an important criterion for the operating parameters of an impending NSC regeneration and targeted generation of ammonia. In addition, it is also possible, for example, for the current ammonia loading, determined on the basis of a model, of the combined catalytic converter 15 to be used as a further criterion. Maximum formation of $NH_3$ may be aimed for, for example, if the temperature of the combined catalytic converter 15 is within a predetermined range of, for example, between 230° C. and 370° C. and the current $NH_3$ loading of the combined catalytic converter 15 is low, and also any further conditions are satisfied.

The device 11 for supplying reducing agent downstream of the engine which is arranged upstream of the oxidation catalytic converter 4 close to the engine can be used to heat the integrated, combined catalytic converter 15 for the purpose of desulfating of the nitrogen oxide storage catalyst coating, with the support of additional engine heating measures, as explained above. The quantity of reducing agent supplied is controlled, inter alia, as a function of the following parameters: the desired temperature of the combined catalytic converter 15, the actual temperature of the combined catalytic converter 15 and the mass flow of exhaust gas.

The oxidation catalytic converter 4 connected upstream of the particulate filter 5 and the device 11 for supplying reducing agent downstream of the engine which is connected upstream of this oxidation catalytic converter 4 can be used to heat the particulate filter. In this arrangement, the combined nitrogen oxide storage and SCR catalytic converter 15 once again remains free of the thermal loading caused by the particulate filter heating. The quantity of reducing agent supplied is controlled, inter alia, as a function of the following parameters: the desired temperature of the particulate filter 5, the actual exhaust gas temperature upstream of the oxidation catalytic converter 4, the actual exhaust gas temperature downstream of the particulate filter 5 and the mass flow of exhaust gas.

It is advantageous in the exemplary embodiment shown in FIG. 4 that the combined nitrogen oxide storage and SCR catalytic converter 15 is protected from high temperatures during the thermal regeneration of the particulate filter 5 and there is no need for an additional oxidation catalytic converter as a final exhaust gas purification system component for oxidizing the undesirable exhaust gas components when secondary air is blown in. The particulate filter 5 may be catalytically coated, in particular with a catalytic coating similar to that of the upstream oxidation catalytic converter 4. In this case the upstream oxidation catalytic converter 4 can be designed to be smaller or with a lower precious metal content, which leads to corresponding space and/or cost benefits. It is optionally also possible for the oxidation catalytic converter 4 connected upstream of the particulate filter 5 to be dispensed with altogether.

The SCR catalyst coating and the nitrogen oxide storage catalyst coating can be applied to a support in suitably mixed form in the combined catalytic converter 15. Alternatively, it is possible for the two coatings to be applied alternately in the direction of flow of the exhaust gas, so that the exhaust gas firstly flows through a region comprising nitrogen oxide storage catalyst coating, then a region comprising SCR catalyst coating, then another region comprising nitrogen oxide storage catalyst coating, etc. This embodiment can also be realized by alternately arranging disks of a nitrogen oxide storage catalytic converter and disks of an SCR catalytic converter in series in a housing. The repeatedly alternating arrangement in the direction of flow of the exhaust gas has the advantage over a mixed combination of the two catalyst materials of resulting in a wider temperature window in which the system operates efficiently. For example, temperature peaks in the front region of the system have a less pronounced effect, for example during the formation of ammonia, if nitrogen oxide storage catalytic converter and SCR catalytic converter are in a repeatedly alternating arrangement than if an arrangement comprising a nitrogen oxide storage catalytic converter and a separate, downstream SCR catalytic converter is used.

FIG. 5 shows an exemplary embodiment in which the internal combustion engine 1 has a two-flow section of the exhaust train 3, with a suitably assigned exhaust gas aftertreatment installation. The latter comprises an $NO_x$ storage catalytic converter 6, an $NO_2$-producing catalytic converter 13 and an SCR catalytic converter 7, as well as associated sensor means 8, 9, 10 and device 11 for supplying reducing agent downstream of the engine, at suitable positions in accordance with the examples shown in FIGS. 1 to 4, arranged identically and symmetrically in each of the two parallel exhaust train sections. The two parallel exhaust trains are combined downstream of the two SCR catalytic converters 7 to form a subsequent single exhaust train section, in which the particulate filter 5, as well as an oxidation catalytic converter 4 connected directly upstream of it and suitable sensor means 8, 9, 14, device 11 for supplying reducing agent downstream of the engine and device 12 for supplying secondary air, are arranged, as shown.

A two-flow arrangement of this type may be appropriate, for example, for engines whereof the cylinders are in a V arrangement. It is a required condition that if exhaust gas turbo-charging is being used, a separate turbocharger be employed for each cylinder bank, since otherwise the two flows have to be combined upstream of the turbine of the turbocharger. The operating strategy for this exhaust gas aftertreatment system is such that only minor modifications are required compared to the operating mode of a single-flow system. This is important, since otherwise expensive new development of additional functions would be required in the control unit 2 of the internal combustion engine 1. Moreover, this approach allows the number of sensors used, and therefore the increased costs for the system as a whole, to be limited. The basic concept is for the two parallel trains to be considered as a single train, so that in principle the same operations take place in both trains. This is only possible if the two trains do not fundamentally differ with regard to untreated engine emissions, catalytic converter types and catalytic converter volumes, etc. More complex approaches, such as for example trains which are operated completely independently of one another and also, for example, time-offset phases of rich exhaust gas, so that lean exhaust gas is always present downstream of the point where the two trains are combined, are alternative options.

The operating mode of this two-flow system substantially corresponds to that of the single-flow system illustrated in FIG. 3, in which the exhaust gas purification components 4 to 7 and 13 are arranged in the same order, and consequently in this respect, reference can be made to the explanations given above in the example shown in FIG. 3. The corresponding processes in each case take place independently and in parallel in the two parallel exhaust train sections. A simple functional structure can be maintained for the control unit 2 by virtue of the fact that in the stored model the fundamentally identical catalytic converters 6 and 7, which are in each case arranged in parallel, of the two parallel exhaust train sections are in each case combined to form a single catalytic converter of double the volume. In one advantageous realization, if differences are detected between the two train sections with regard to the demand for NSC regeneration, it is possible to provide for an NSC regeneration to be initiated even if $NO_x$ emissions which exceed the predetermined threshold value are detected at only one of the two $NO_x$ storage catalytic converters 6. Alternatively, the signals from the $NO_x$ sensors 9 downstream of the $NO_x$ storage catalytic converters 6 can be used in averaged or other weighted form as a representative nitrogen oxide concentration downstream of the $NO_x$ storage catalytic converter for the NSC model in the control unit 2.

When the aim is for high levels of ammonia to be formed, one of the two lambda sensors 10 downstream of the two parallel $NO_x$ storage catalytic converters 6 measuring a value below the associated threshold value $\lambda_1$ can be used as a criterion for terminating NSC regenerations. If the aim is for no ammonia to be formed, the NSC regeneration is, for example, terminated as soon as the air ratio downstream of one of the two parallel $NO_x$ storage catalytic converters 6 drops below the threshold value $\lambda_2$.

An advantage of the exemplary embodiment shown in FIG. 5 is that, despite the geometry of the exhaust system differing significantly, the operating strategy remains similar to that used for the single-flow system shown in FIG. 3, and the properties and effects explained above in connection with this single-flow system are achieved in the same way, without any significant additional functions having to be provided for the control unit 2.

As an alternative to the example shown, it is also possible for the two parallel exhaust train sections to be combined to form a subsequent single-flow train section immediately downstream of the two parallel $NO_x$ storage catalytic converters 6; in this case, there is then only one SCR catalytic converter 7 with upstream optional $NO_2$-producing catalytic converter 13, located in this single-flow train section. In further alternative embodiments, it is possible to use integrated nitrogen oxide storage and SCR catalytic converters in each of the plurality of train sections, in accordance with the example shown in FIG. 4, and/or to use a different order of the exhaust gas purification components, in particular in accordance with FIGS. 1, 2 and 4.

Whereas the exemplary embodiments shown refer to an internal combustion engine of a motor vehicle, it will be understood that the exhaust gas aftertreatment installation according to the invention and the exhaust gas aftertreatment method according to the invention, as illustrated and explained above with reference to the examples shown, can also be used for other, for example stationary combustion devices which generate an exhaust gas which needs to be purified.

The invention claimed is:

1. An installation for aftertreatment of exhaust gas generated by a combustion device, said installation comprising the following components:
   a nitrogen oxide storage catalytic converter configured for temporarily storing nitrogen oxides contained in the exhaust gas during adsorption operating phases with a lean exhaust gas air ratio, and releasing and reducing stored nitrogen oxides, during regeneration operating phases with a rich exhaust gas air ratio;
   an SCR catalytic converter arranged downstream of the nitrogen oxide storage catalytic converter, said SCR catalytic converter being configured to receive and store ammonia generated by the nitrogen oxide storage catalytic converter, and to reduce nitrogen oxides in the exhaust gas with the stored ammonia;
   a particulate filter arranged upstream of the SCR catalytic converter and downstream of the nitrogen oxide storage catalytic converter; and
   a reducing agent supplying device coupled to feed reducing agent into the exhaust gas downstream of the combustion device and upstream of the nitrogen oxide storage catalytic converter such that during lean-burn operation of the combustion engine, an exhaust gas air ratio upstream of the nitrogen oxide storage catalytic converter is lowered into a rich range, for performing regeneration of the nitrogen oxide storage catalytic converter.

2. The installation according to claim 1, further comprising a first oxidation catalytic converter arranged upstream of the nitrogen oxide storage catalytic converter.

3. The installation according to claim 1, further comprising an $NO_2$ producing catalytic converter disposed upstream of the SCR catalytic converter.

4. The installation according to claim 3, wherein said $NO_2$ producing catalytic converter includes a catalyst material which allows ammonia contained in the exhaust gas to pass through without a conversion reaction when the exhaust gas composition is rich.

5. The installation according to claim 2, further comprising a second oxidation catalytic converter disposed at a downstream extremity of the installation.

6. The installation according to claim 1, wherein said particulate filter has a catalytic coating.

7. The installation according to claim 1, further comprising means for determining a nitrogen oxide content in the exhaust gas stream, downstream of at least one of said components which is selected from the group consisting of the nitrogen oxide storage catalytic converter and the SCR catalytic converter.

8. The installation according to claim 1, further comprising means situated downstream of at least the nitrogen oxide storage catalytic converter, for determining an ammonia amount from the SCR catalytic converter loading or from the exhaust gas stream.

9. The installation according to claim 1, further comprising a reducing agent supplying device configured to feed fuel into the exhaust gas stream, as a reducing agent.

10. The installation according to claim 9, wherein said fuel is hydrogen.

11. An exhaust gas aftertreatment method for a combustion device, said method comprising:
    operating the combustion device under lean-burn conditions;
    temporarily storing nitrogen oxides contained in the exhaust gas in a nitrogen oxide storage catalytic converter during adsorption phases;
    releasing stored nitrogen oxides from the nitrogen oxide storage catalytic converter during regeneration phases, and thereby generating ammonia;
    temporarily storing generated ammonia;
    using the stored ammonia for nitrogen oxide reduction in an SCR catalytic converter arranged downstream of the nitrogen oxide storage catalytic converter; and
    during operation of said combustion device under lean burning conditions, lowering an exhaust gas air ratio upstream of the nitrogen oxide storage catalytic converter into the rich range, by feeding reducing agent being fed to the exhaust gas, for regeneration of the nitrogen oxide storage catalytic converter in a respective regeneration phase.

12. The method according to claim 11, further comprising:
    filtering out particulates contained in the exhaust gas leaving the nitrogen oxide storage catalytic converter; and
    guiding filtered exhaust gas to SCR catalytic converter.

13. The method according to claim 11, wherein the combustion device is operated within an air ratio between 1.0 and 1.2 in said regeneration phases.

14. The method according to claim 11, further comprising enhancing an $NO_2$-ratio of the nitrogen oxides in the exhaust gas by means of a catalytic oxidation with an $NO_2$-producing catalytic converter.

15. The method according to claim 11, wherein the lowering of said air ratio is based on a desired ammonia generation quantity.

16. The method according to claim 11, further comprising:
    adjusting a duration of a regeneration operation phase based on a desired ammonia generation quantity.

17. The method according to claim 11, further comprising:
    determining an exhaust air ratio downstream of the nitrogen oxide storage catalytic converter; and
    terminating a regeneration operation phase if the determined exhaust air ratio drops below a threshold value.

* * * * *